United States Patent [19]

Ruffing et al.

[11] 4,200,818

[45] Apr. 29, 1980

[54] RESIN IMPREGNATED AROMATIC POLYAMIDE COVERED GLASS BASED SLOT WEDGE FOR LARGE DYNAMOELECTRIC MACHINES

[75] Inventors: Charles R. Ruffing, Edgewood Borough, Pa.; Smith A. Gause, Hampton, S.C.; John C. Botts, LaGrange, Ga.; Harry E. Smith, Varnville, S.C.

[73] Assignee: Westinghouse Electric Corp., Pittsburgh, Pa.

[21] Appl. No.: 930,090

[22] Filed: Aug. 1, 1978

[51] Int. Cl.² .............................................. H02K 3/48
[52] U.S. Cl. ................................... 310/214; 428/213; 428/215; 428/267; 428/268
[58] Field of Search .................. 310/214, 215; 428/37, 428/74, 213, 215, 267, 268

[56] References Cited

U.S. PATENT DOCUMENTS

| | | | |
|---|---|---|---|
| 3,437,858 | 4/1969 | White | 310/214 |
| 3,624,432 | 11/1971 | Merz | 310/214 |
| 3,735,169 | 5/1973 | Balke et al. | 310/214 |
| 3,974,314 | 8/1976 | Fuchs | 310/215 |
| 4,018,962 | 4/1977 | Pedlou | 428/268 |
| 4,087,712 | 5/1978 | Mosimann et al. | 310/215 |
| 4,093,881 | 6/1978 | Liptak et al. | 310/214 |

FOREIGN PATENT DOCUMENTS

2355516   7/1975   Fed. Rep. of Germany ............ 310/215

Primary Examiner—William R. Dixon, Jr.
Attorney, Agent, or Firm—D. P. Cillo

[57] ABSTRACT

An iron engaging slot wedge, for use in coil slots of dynamoelectric machines is made of a glass fiber core impregnated with a cured thermoset resin, and covered on at least two sides with a facing layer of a porous aromatic polyamide mat, impregnated with a cured thermoset resin.

12 Claims, 5 Drawing Figures

RESIN IMPREGNATED AROMATIC POLYAMIDE COVERED GLASS BASED SLOT WEDGE FOR LARGE DYNAMOELECTRIC MACHINES

BACKGROUND OF THE INVENTION

Slot wedges are strips of electrically insulating material, used to retain conductors in the coil slots of stators of dynamoelectric machines such as generators and motors. Prior art slot wedge structures have included phenolic resin impregnated, flat, Kraft paper sheet laminates. However, when subjected to temperatures on the order of 100° C., after several years use, in large generators and motors, some shrinkage of the Kraft paper laminates was encountered. In addition, the Kraft paper-phenolic wedges had poor interlaminar shear length, and were abrasive to the inner surface edges of the iron stator teeth during the wedge driving operation. Asbestos-phenolic slot wedges have found wide acceptance, having good stability and lubricity characteristics, but the use of asbestos is now considered to be a potential health hazard.

White, in U.S. Pat. No. 3,437,858, tried to remedy shrinkage and shear strength problems, by providing a polyester resin impregnated, parallel glass fiber, extruded slot wedge, having a core of low shear strength. This structure included at each end, a metal or glass fiber tube, rod, tape or cord, having a very high shear strength. Thus, the highest shear strength was at the portion of the wedge that contacted the inner surface of the stator teeth. This wedge was faced with a 5 to 30 mil thick tape of wrapped woven glass, which provided a high transverse bonding strength, and allowed increased driving pressure during wedge insertion. The tape covering also added to the shear strength of the wedge, since ½ of the glass fibers were transverse to the slot wedge core fibers. Such wedges would, however, still be abrasive to the inner surface edges of the iron stator teeth, during the wedge driving operation.

Balke, in U.S. Pat. Nos. 3,735,169, provided plural players of Kapton polyimide film, or Nomex (poly 1,3-phenyleneisophthalamide) polyamide, high density, fibrous sheet, laminated together with adhesive, to form flat composites. These sheets, with applied adhesive, were placed in a clamping fixture, and then laminated, to cure the adhesive. They formed rigid plastic wedges, with high temperature dimensional stability, having the desired channel shaped slot wedge configuration, without using a supporting core. Such a construction, however, relies upon the thin adhesive layer for rigidity, and would provide wedges which could still allow substantial conductor displacement and vibration. This type of wedge would be practical for small appliances, where coil forces are about 1 lb./inch length of slot wedge, but not for large dynamoelectric machines, with coil forces of about 100 lb./inch length of slot wedge.

What is needed, is a strong wedge, able to prevent conductor displacement and vibration, and resist shear stresses, shrinkage, and bowing caused by the pressure of the wedged conductors and heat. The wedge should, very importantly, also provide a compressible iron engaging surface of considerable resiliency and lubricity, which would not abrade the inner surface edges of the laminated stator teeth during the wedge driving operation.

SUMMARY OF THE INVENTION

The above described problems have been solved, and the above need met, by providing a resin impregnated, aromatic polyamide covered, glass cloth slot wedge, adapted to be positioned in the teeth of coil slots in dynamoelectric machines. A thermoset resin impregnated, aromatic polyamide surface, on at least the two major teeth contacting sides, provides outstanding lubricity, resiliency, tensile strength and thermal stability. It also has the ability to notch during wedge insertion, rather than abrade the edges of the stator teeth.

The aromatic polyamide is preferably in mat form, about 0.005 to about 0.025 inch thick, and forms a 70% to 95% porous matrix for the thermoset resin. The mat is impregnated, between about 60 to about 80 wt.%, with a cured thermoset resin. The glass cloth core is about 0.2 to about 0.5 inch thick, and impregnated between about 40 to about 60 wt.%, with a cured thermoset resin. This combination provides outstanding interlaminar shear strengths of over about 2,500 lb./in. length at 100° C.

The resin impregnated aromatic polyamide felt mat is placed in a suitable mold cavity, with the resin impregnated glass fabric superimposed thereon. Steam press platens are then used to cure the resins and laminate the two layers, without adhesives, into a unitary, consolidated, composite. The organic Aramid fiber matrix, impregnated with cured thermoset resin, provides a resilient surface layer that protects the inner surface edges of the stator iron during the wedging operation, and allows the use of high strength glass core materials which in the past have been found abrasive when used alone. The winding bracing system of this invention, controls stator forces from steady state and short circuit conditions. It is particularly useful in large generator stator applications.

BRIEF DESCRIPTION OF THE DRAWINGS

For a better understanding of the invention, reference may be made to the preferred embodiments exemplary of the invention, shown in the accompanying drawings in which.

DESCRIPTION OF THE PREFERRED EMBODIMENTS

Figure 1:
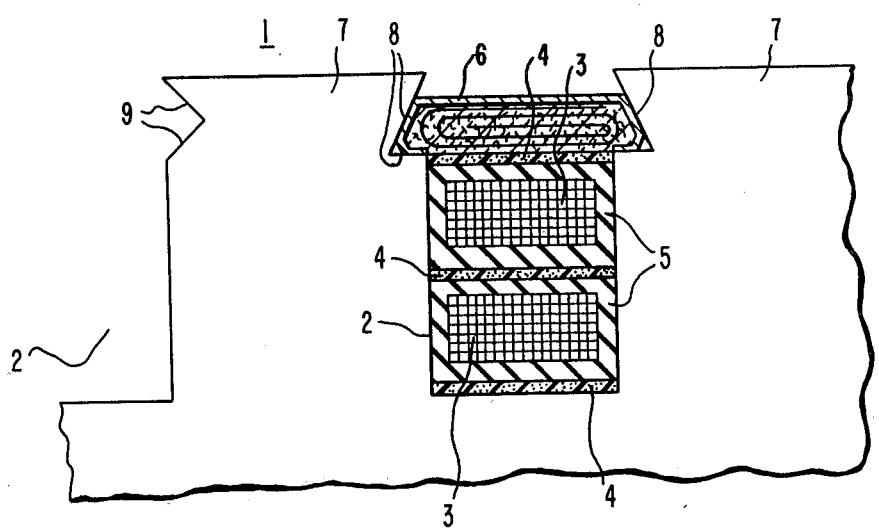
FIG. 1 is a cross-sectional view of one type of stator for a dynamoelectric machine, showing the teeth of a coil slot and a slot wedge inserted therein.

Referring now to FIG. 1, metal member of a dynamoelectric machine, such as a stator 1 is shown, with a conventional construction, consisting of coil slots 2, containing coil conductor windings 3, which may also contain cooling ducts. Each coil is bounded, at the top and bottom, by phenolic resin impregnated Kraft paper, or other suitable separator sheet materials 4, and surrounded by insulation 5, as is well known in the art. The insulation 5, will generally comprise a moisture resistant, elastic combination of thermosetting resin and mica flakes. Slot wedge 6 is a brace for the coil windings, and is shown disposed between the top conductor windings and the laminated iron stator teeth 7. The slot wedge is inserted between the teeth of the coil slot, and contacts the inner surface edges 8 of the stator teeth 7. The interior surface of the teeth is a notch in the laminated stator iron components, and can have a variety of configurations, such as shown at 8 or 9.

Each stator for a large dynamoelectric machine, comprises a plurality of low-loss silicon-steel core punchings. For example, a large generator stator can be 10 feet in diameter and 20 feet long. It can comprise as many as 30 separate punchings per inch. Each lamination, before punching, is coated with a high temperature inorganic insulation, such as sodium silicate or a phosphate type insulation. The lamination is then punched, deburred and recoated.

The punched laminations having the cross-section of the stator coil are then stacked on building bolts and firmly clamped together by insulated thru-bolts and nonmagnetic finger plates, to form a stator body having coil slots and stator teeth. The insulation between each laminated punching helps to prevent current losses, at operating temperatures, along the outside surface of the stator. Because of the number of individual laminations, it is impossible to align the teeth sections to greater than a $\pm 0.010$ inch tolerance. Therefore, many of the teeth edge laminations will be "sticking out," and subject to bending or shearing by the slot wedge during slot wedge insertion.

If the teeth edge laminations are bent or sheared, they can contact each other, causing electrical short circuits, and defeating the purpose of the interlaminar insulation. Therefore, it is essential that the slot wedge exterior be of substantial lubricity, and of a type construction able to be scraped by the stator teeth laminations, without bending the laminations, while still maintaining its structural integrity.

When the insulated conductor windings and the separators are inserted into place in the coil slots, then a plurality of slot wedges 6 are driven into place by a suitable driving means such as a block and mallet. Friction contact occurs between the slot wedge iron engaging exterior surface, and the stator iron laminated punchings, at teeth edge contact points 8, on the side and bottom of the slot wedge. In general, the slot wedge assembly has a length equal to that of the coil slot, and usually consists of a plurality of wedges approximately 6" in length. Therefore, a 20-foot long stator would contain 40 slot wedges per slot. The slot wedges of this invention are easily molded to various configurations and are easily machinable.

Figure 2:
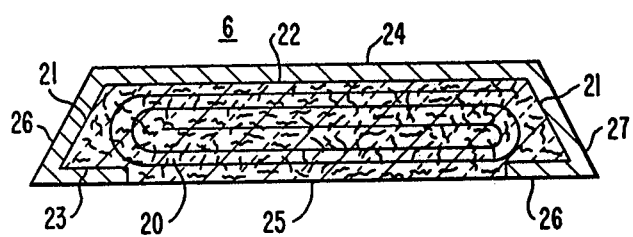
FIG. 2 is a cross-sectional view of one type of slot wedge encompassed by this invention, showing the details of the core and wrapper arrangement.

A preferred type of slot wedge 6 is shown in detail in FIG. 2. The slot wedge 6, consists of a glass fiber core 20, such as glass fibric or cloth. The glass fiber core may be in machined sheet form, but is preferably in spiral, i.e., wound or rolled form, as shown. A rolled core is particularly useful, since it increases the interlaminar shear strength of the core by 10% to 20%. Thus, exterior edges 21 of a rolled core can withstand a greater outward force from the coils held in the coil slots. The slot wedge core is impregnated with a thermoset resin such as, for example, a phenolic resin or an epoxy resin, both of which are well known in the art. These resins can contain a variety of well-known curing agents, accelerators and inhibitors.

The glass cloth used in the core will have a thickness of about 0.003 to 0.01 inch. After overlaying or rolling, and curing in the mold, the glass cloth will provide a core having a thickness of from about 0.200 to about 0.500 inch. It will be impregnated with about 40 to about 60 wt.% of a cured thermoset resin, based on resin plus glass cloth weight. Thicknesses below 0.200 inch and resin loadings below 40 wt.% will allow voids to seriously impair the core strength.

The glass fiber core is covered, on at least two sides, by an aromatic polyamide mat, i.e., felt, facing, which has at least a 70% porous structure, generally about 70% to 95% porosity, before resin impregnation. This low density allows very high resin loading, within a tough Aramid matrix having exceptional tensile strength. The covering is integrally laminated and bonded to at least the teeth facing, iron engaging side surfaces 21 of the core, and generally, for ease of application, to the top surface 22 and the iron engaging edge part of the bottom surface at 23 as well. This provides a slot wedge having a top surface 24, a bottom coil facing surface 25, the iron engaging edges 26 which will contact the teeth of the stator, and two primary iron engaging teeth contacting sides 27.

This covering must consist of a resin impregnated aromatic polyamide mat. Many other materials, such as aromatic polyimides are difficult to bond to the glass core surface. The covering must not be in film form, since this type of covering will have a tendency to shear from the glass core during the wedging operation. The aromatic polyamide mat is preferably in a single layer, non-woven form, about 0.005 to about 0.025 inch thick after molding. The mat provides a matrix of about 5 to 30 volume percent of theoretical density, i.e., 70 to 95 percent porosity, which is impregnated with about 60 to about 80 wt.% of a cured thermoset resin, based on resin plus mat weight. The thermoset resin can be, for example, a phenolic resin or an epoxy resin, which can contain a variety of well-known curing agents, accelerators and inhibitors.

Thicknesses of the molded polyamide-resin mat below 0.005 inch, will not provide a sufficient thickness to allow facing compression, and to allow the rough teeth edge surfaces to score and scrape the wedge as it is being driven. Thicknesses below 0.005 inch will reduce the resiliency of the facing and cause possible rupture or tearing of the mat, and contact of the iron teeth laminations with the abrasive glass cloth core. Resin loading below 60 wt.% will seriously impair the adhesion of the covering to the core, since some of the resin used in the covering seeps into the core during high pressure lamination, providing outstanding bonding of the two components of the laminate without use of adhesives. Less than 60 wt.% resin would also decrease the lubricity of the covering and its ability to absorb the mechanical scraping and scoring of the teeth punchings.

An all aromatic polyamide slot wedge is not useful for large dynamoelectric machines because of excessive creep and shrinkage at operating temperatures. The preferred thickness ratio of impregnated glass fiber core layer:impregnated aromatic polyamide facing layer is between about 10:1 to about 100:1. A ratio less than 10:1 will cause shrinkage problems. A ratio over 100:1, i.e., very thin covering layer, will cause possible abrasion problems.

Aromatic polyamide, in yarn, paper, mat and fiber form are well known in the art, and comprise aromatic rings united by carbonamide links

Such aromatic nylon materials have a wide range of chemical and physical properties, and have excellent thermal stability. They can be prepared by reacting an aromatic diamine with an aromatic diacid chloride in an aqueous system. A complete description of their properties and synthesis can be found, for example, in U.S. Pat. Nos. 3,671,542 and 3,240,760, herein incorporated by reference. These Aramids are used in this invention in the form of high molecular weight filament mats. These fibrous mats comprise substantially round fiber filaments having an approximate average diameter of between about 0.0001 to 0.0008 inch. The mat may also contain fibrid binder particles. The mat has about 90% to 100% resiliency against compaction, i.e., it will absorb impact easily and return to its original shape. Such resiliency is retained to a great degree even when the mat is loaded with resin.

The most preferred aromatic polyamide is a poly (phenylenephthalamide) having a tensile strength of over about 90,000 and preferably over about 250,000 lb./sq.in., and a tensile modulus of over about $2.0 \times 10^6$ and preferably over about $10 \times 10^6$ lb./sq.in. One example of this type of material consists essentially of recurring units of poly (1,4-phenyleneterephthalamide):

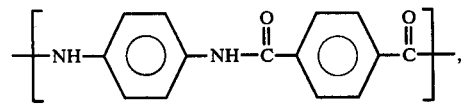

described as Kevlar by Gan et al, in Vol. 19 of the *Journal Of Applied Polymer Science*, pp. 69-82 (1975). These tensile properties will provide a reasonably close match with the glass in the core, which has a tensile strength of approximately 200,000 to 400,000 lb./sq.in., and a tensile modulus of about $10 \times 10^6$ lb./sq.in.

By closely matching the values of the two components of the laminated composite, there will be less chance of delamination under the coil pressures and temperatures encountered in large dynamoelectric machines, which can be about 75 to 150 lb./inch length of slot wedge at about 75° C. to 125° C. Also, no adhesive need be used to bond the Aramid and glass together. The aromatic polyamides, when in porous mat form provide a matrix of about 5 to 30 volume percent density for the thermoset resin. The impregnated, cured mat is resilient, flexible and has lubricating properties, allowing it to absorb scraping contact with rough surfaces.

Figure 3A:
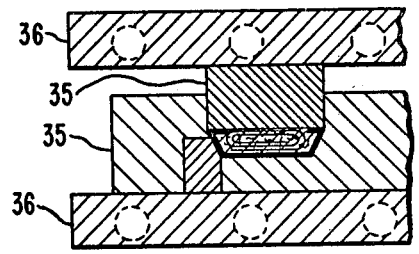
FIG. 3(a) shows one method of making the laminate stackup for the slot wedges of this invention.

FIG. 3(a) shows the aromatic polyamide felt 31, impregnated with resin and a roll of impregnated glass fabric 32. They are placed in the mold 35 with associated steam platens 36, shown in FIG. 3(b).

EXAMPLE 1

Several resin impregnated aromatic polyamide faced glass based slot wedges were made. A style #7628 glass cloth strip, 2⅜" wide, and 0.010" thick, was impregnated with an acetone solution of a bisphenol A epoxy resin, having an epoxy equivalent weight of 450 to 500, (sold commercially by Shell Chemical Co. as EPON 1001) using trimellitic anhydride as a catalyst. This impregnated strip was passed through a treating tower at 140° C., to evaporate the acetone solvent. This provided a B staged, non-tacky strip, with about 50 to 55 wt.% resin loading, which was cut to a 60" length.

A 75% porous, i.e., 25 vol.% dense strip of high modulus aromatic polyamide non-woven felted mat, having a weight of 7 oz./sq.yd., a tensile strength of about 300,000 to 400,000 lb./sq.in., and about 95% resiliency (described as primarily poly 1,4-phenyleneterephthalamide, sold commercially as Kevlar 29 by E.I. DuPont De Nemours & Co.) 3½" wide and 0.125" thick, was impregnated with a methanol solution of a phenol-formaldehyde resin. This impregnated strip was passed through a treating tower at about 140° C., to evaporate the solvent. This partly cured the resin in the strip, and provided a dry pre-preg, with about 70 to 75 wt.% of phenolic resin in a 25 vol.% Aramid matrix. The strip was then cut to 6" lengths.

Figure 3B:
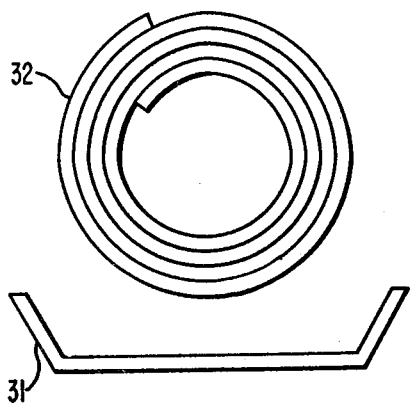
FIG. 3(b) shows the slot wedges being formed in a two cavity mold.

The epoxy-glass strip was rolled into a 20 layer thick tube and superimposed on the phenolic-Kevlar covering strip, as shown in FIG. 3(a) of the drawings. The phenolic-glass tube was pressed flat and the ends of the phenolic-Kevlar strips were bent over the flattened tube top. No adhesives were used. This lay up was placed in a mold cavity, as shown in FIG. 3(b), and heat and pressure consolidated between hot press platens at 155° C. for ½ hour at 1,000 psi. The composite was allowed to cool, and then removed, to provide a consolidated, bonded, laminated slot wedge. The molded composite had a resilient, lubricating, aromatic polyamide facing on the short face side, the two teeth contacting edge sides and on the edges of the bottom side, as shown in FIG. 2 of the drawings. The aromatic polyamide covering was compressed to a thickness of about 0.015", and the aromatic polyamide matrix was loaded with about 70 wt.% resin. The glass cloth core was about 0.36" thick, and was loaded with about 50 wt.% resin. There appeared to be excellent bonding of the two adhesiveless layers.

Tests were then run on this composite for strength and stability. The wedge was placed, face down, in a hollow steel test fixture having a simulated stator surface. Here, the beveled side edges rested on steel in the fixture, and a steel pressing bar simulating conductor winding pressure in a stator, was pressed against the coil bracing back of the slot wedge. A 30 ton Amsler Universal testing machine was used in conjunction with a Baldwin microformer unit to measure deflection. The test assembly was operated in an oven with a thermometer attached to the specimen. The interlaminar wedge shear strength at 100° C. was measured to be 3,510 lb./inch length of slot wedge. This is over 230% above the usual 75 to 150 lb./inch length coil pressure found in most large dynamoelectric machines and well above the 1,500 lb./inch length typical of phenolic resin Kraft paper sheet slot wedges.

A similar slot wedge was tested at 100° C. and 150 psi for 48 hours. This test simulated actual dynamoelectric machine operating conditions. The % thickness shrinkage, and % bowing of the slot wedge after removal was not measurable. This is a dramatic improvement over the 2% to 4% shrinkage for phenolic resin Kraft paper sheet slot wedges, and 5% shrinkage for an all Kevlar wedge impregnated with phenolic resin. The observed shrinkage of Kevlar requires its use in combination with a glass core, in order to be useful in large dynamoelectric machines.

Figure 4:
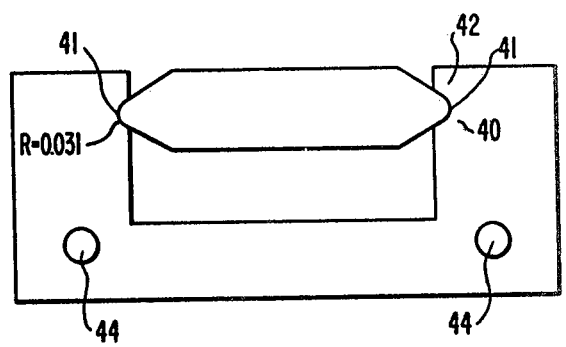
FIG. 4 shows a test apparatus used to determine iron abrasion in the Example.

Abrasion tests were run using a machined, solid Aramid slot wedge and a test fixture, shown in FIG. 4 of the drawings. The test fixture 40 comprised a 5" long stack of laminated punchings, each insulated from each other by a phosphate type insulation. There were 30 punchings per inch of fixture length. The slot wedge consisted of a molded block of sheets of phenolic resin impregnated Kevlar aromatic polyamide. The molded block was about 0.04" thick, 7.5" long, and provided a 25 vol.% aromatic polyamide matrix loaded with about 75 wt.% phenolic resin. The color of the wedge was pale yellow. The block was machined to a length of 0.976±0.015 inches with a 0.031 radius at its ends, as shown at 40 in FIG. 4. A similar wedge was machined from a 0.04" thick molded block of epoxy resin impregnated glass cloth. Both wedges were machined to exactly matching dimensions. The distance between the deepest portion 41 of the teeth 42 of the fixture was 1.0 inches. Bolts 43 holding the laminated punchings of the test fixture together are shown as 44.

The abrasion test was a short, mechanical push-pull stroke, applying 150 psi force between the wedge and the iron that moved each wedge through the punchings. New punchings were used for each test fixture. Testing was conducted at 25° C. This test very closely simulated actual wedge insertion conditions for generator stators. Both the phenolic-aromatic polyamide wedge and the epoxy-glass cloth wedge were moved through their test fixtures, engaging the iron for 1,000 cycles. Iron deposits were found on the contacting surfaces of the epoxy-glass cloth wedge. The phenolic-aromatic polyamide wedge appeared to have less effect on the punchings and did not have any appreciable iron deposits on the contacting surfaces. The phenolic-aromatic polyamide wedge showed much more wear. Scanning electron micrographs of the punchings of each test fixture were examined and the punching edges in contact with the phenolic-aromatic polyamide showed much less wear than the punching edges in contact with the epoxy glass cloth wedge. Water absorption tests were run according to standard ASTM D-570, which involves immersing samples in 25° C. water for 24 hours. The results showed very good results of 1.1% water absorption by weight for the phenolic-aromatic polyamide-epoxy glass cloth wedge.

Phenolic-aromatic polyamide faced, epoxy-glass cloth slot wedges, made as described above were tested in approximately 6" lengths, as a stator winding wedge system, in the slots of a stator in a large two pole steam turbine generator 20 KV, 669 Megawatt, with outstanding results. These slot wedges were easily driven into the slots, did not harm the iron edge laminations they contacted, insuring the magnetic integrity of the stator core assembly. The slot wedges also maintained radial pressure on the coils, holding the pressed coils tightly in place to prevent vibration.

We claim:

1. An iron engaging slot wedge adapted to be positioned in the coil slots of a dynamoelectric machine comprising a glass fiber core impregnated with a cured thermoset resin, and covered, on at least two sides, with a facing layer of a mat of aromatic polyamide fiber, impregnated with a cured thermoset resin.

2. The slot wedge of claim 1, having an interlaminar shear strength of over about 2,500 lb./in. of length at 100° C.

3. The slot wedge of claim 1, wherein the glass fiber core is in spiral form, and the facing layer covers the iron engaging sides of the wedge.

4. The slot wedge of claim 1, wherein the facing layer is a single layer in non-woven form and the thickness ratio of glass fiber core:facing layer is between about 10:1 to about 100:1.

5. The slot wedge of claim 1, wherein the glass fiber core is between about 0.2 inch to 0.5 inch thick and impregnated between about 40 wt.% to about 60 wt.% with a cured resin selected from the group consisting of epoxy resin and phenolic resin.

6. The slot wedge of claim 1, wherein the facing layer is between 0.005 inch to about 0.025 inch thick, impregnated with a cured resin selected from the group consisting of epoxy resin and phenolic resin, and the aromatic polyamide consists essentially of a poly (phenylenephthalamide) having about 95% to 100% resiliency against compaction.

7. The slot wedge of claim 6, wherein the facing layer consists essentially of a poly (phenylenephthalamide) having a tensile strength of over about 250,000 lb./sq.in.

8. The slot wedge of claim 6, wherein the aromatic polyamide consists essentially of poly (1,4-phenyleneterephthalamide).

9. The slot wedge of claim 6 wherein the core resin impregnant is an epoxy resin and the facing layer resin impregnant is a phenolic resin.

10. A generator comprising a stator containing a plurality of slot wedges having the construction of claim 6.

11. In the coil slot of a dynamoelectric machine, a laminated, slot wedge facing wound coils consisting essentially of a glass fiber core impregnated between about 40 wt.% to about 60 wt.% with a cured thermoset resin, and covered, on at least two sides, with a resilient facing layer consisting essentially of a poly (phenylenephthalamide) fiber matrix of at least 70% porosity, impregnated with about 60 wt.% to about 80 wt.% of a cured thermoset resin, said slot wedge having an interlaminar shear strength of over about 2,500 lb./in. of length at 100° C.

12. The slot wedge of claim 11, wherein the facing layer consists essentially of poly (1,4-phenyleneterephthalamide), the core resin impregnant is an epoxy resin, the covering layer resin impregnant is a phenolic resin, the thickness ratio of glass fiber core:facing layer is between about 10:1 to about 100:1; and the thickness of the core is between about 0.2 inch to about 0.5 inch.

* * * * *